Patented Aug. 27, 1946

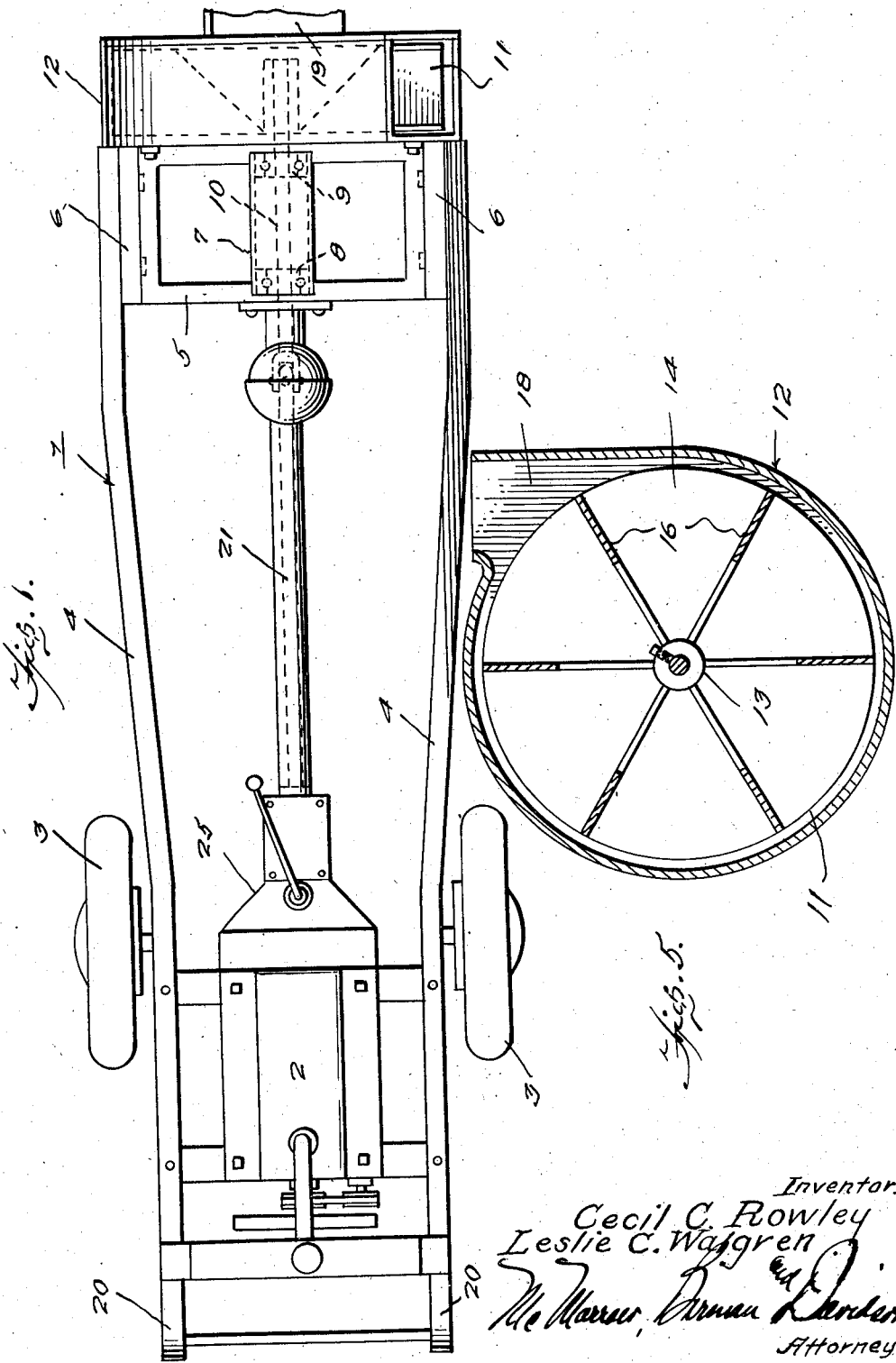

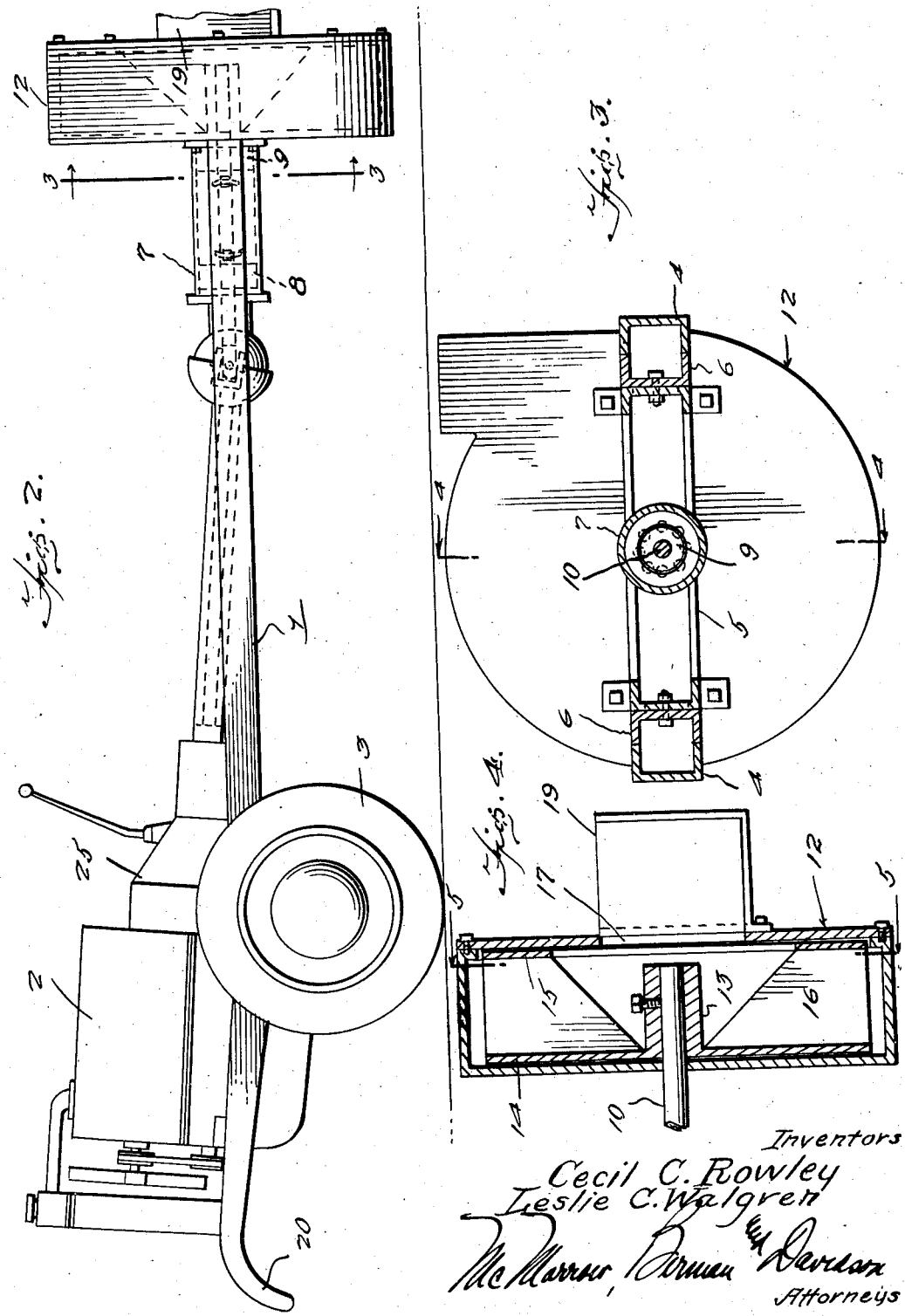

2,406,566

UNITED STATES PATENT OFFICE 2,406,566

GRAIN BLOWER

Cecil C. Rowley and Leslie C. Walgren, Wauneta, Nebr.

Application July 3, 1945, Serial No. 603,058

6 Claims. (Cl. 302—17)

This invention relates to grain conveyors, and more particularly to grain conveyors of the pneumatic type such as are used for handling, elevating and transferring grain and the like.

A main object of the invention is to provide a novel and improved pneumatic grain conveyor device of simple construction which is portable and which is easy to operate.

A further object of the invention is to provide an improved grain conveyor device employing a counterbalanced chassis including an internal combustion engine to furnish the lifting power.

Further objects and advantages of the invention will appear from the following description and claims, and from the accompanying drawings, wherein:

Figure 1 is a top view of a grain conveyor device in accordance with this invention.

Figure 2 is a side elevational view of the conveyor device of Figure 1.

Figure 3 is a detail cross-sectional view taken on line 3—3 of Figure 2.

Figure 4 is a cross-sectional view taken on line 4—4 of Figure 3.

Figure 5 is a detail cross-sectional view taken on line 5—5 of Figure 4.

Referring to the drawings, 1 designates the conveyor chassis, which comprises a pair of longitudinal members 4—4 connected by appropriate transverse members to form a rigid frame structure.

At the forward portion of the frame structure an internal combustion engine 2 is mounted, said engine providing the power for the conveyor. Engine 2 has associated therewith a variable gear transmission 25. Chassis 1 is supported on a pair of wheels 3, 3, the engine 2 being located forwardly with respect to said wheels to substantially counterbalance the remainder of the conveyor structure.

The rear portion of the frame structure comprises a rectangular frame member 5 built up of inwardly facing channel members, the short sides of member 5 being bolted to supporting channel sections 6, 6 welded to the respective longitudinal members 4, 4. Secured centrally of frame 5, as by welding, is a cylindrical housing member 7 provided with a forward bearing 8 and a rear bearing 9 within which is journaled a shaft 10. The forward end of shaft 10 is connected by a universal joint to the power shaft 21 which extends from transmission 25. The rearward end of shaft 10 is connected to a blower fan 11 contained within a blower housing 12 secured to the rear end of chassis 1. The power shaft sections are housed in appropriate tubular guard sleeves and the universal joint is likewise protected by mating hemispherical guards secured to the respective tubular guard sleeves at the joint.

Blower fan 11 comprises a hub 13 carrying integrally secured thereto a disc element 14. Disc 14 is formed with a plurality of radial trapezoidally-shaped vanes 16 defining a generally conical intake space at the rearward portion of the fan. A flat annular ring element 15 is rigidly secured, as by welding, to the rearward edges of vanes 16 to rigidify and strengthen the fan.

Fan housing 12 comprises a generally cylindrical drum having an intake opening 17 centrally located in its rear wall and an outlet passage 18 extending tangentially upward from its cylindrical side wall. Passage 18 is adapted to be connected to an appropriate conduit leading to a desired deposit receptacle, such as a grain bin. Secured to the rear wall of the fan housing adjacent intake opening 17 is a scoop member 19 formed with a side wall, a front wall and a bottom wall. The shape of scoop member 19 is such as to prevent overloading of the fan by acting as a baffle to guide the grain laterally into housing intake opening 17 while air is supplied from above the scoop. A vigorous air current is thus set up by the rotating fan which facilitates smooth movement of the grain through the blower housing to outlet passage 18.

Engine 2 is adapted to drive the blower fan at a speed in the neighborhood of 600 revolutions per minute, which provides effective suction and conveying action.

The fan is substantially counterbalanced by the weight of engine 2 so that the blower head may be easily lifted and positioned at desired locations with respect to the pile of grain to be transferred. The forward portions of longitudinal members 4, 4 formed with curved handle elements 20, 20 to facilitate manipulation of the conveyor.

While a specific embodiment of a grain conveyor device has been disclosed in the foregoing description, it will be understood that various modifications within the spirit of the invention may occur to those skilled in the art. Therefore, it is intended that no limitations be placed on the invention other than as defined by the scope of the appended claims.

What is claimed is:

1. A grain conveyor comprising a chassis mounted intermediate its length on a pair of wheels, a prime mover mounted on said chassis on one side of said wheels, and a suction fan mounted on said chassis on the other side of said wheels, said suction fan being connected to said prime mover and being spaced with respect to said wheels so as to substantially counterbalance said prime mover.

2. The structure of claim 1, and wherein said suction fan comprises a rotary impeller contained within a housing having an axial intake opening and a tangential outlet passage, and wherein baffle means is provided at said intake opening for guiding grain laterally into said opening.

3. The structure of claim 1, and wherein said suction fan comprises a rotary impeller contained within a housing, said housing having an axial intake opening and a tangential outlet passage, and wherein baffle means embodying a scoop like wall element is provided at said intake opening for simultaneously guiding grain laterally into said opening and air downwardly into said opening.

4. A grain conveyor comprising a pivotally mounted chassis, a prime mover mounted on said chassis on one side of the pivot, a rotary pneumatic conveyor fan mounted on said chassis on the other side of said pivot whereby to substantially counterbalance said prime mover, said prime mover being operatively connected to said rotary fan, said fan comprising a housing secured to the end portion of said chassis, and a rotor contained within said housing, said housing having an axial intake opening at its rear wall and a tangential outlet passage at its side wall, and baffle means adjacent said opening preventing direct axial entry of grain therein.

5. The structure of claim 4, and wherein said baffle means comprises a wall element and means for supporting said wall element adjacent to but in spaced relation from said opening.

6. The structure of claim 4, and wherein said baffle means comprises a scoop element having a bottom wall, a side wall and a rear wall, said bottom wall and side wall forming a bottom and side margin for said opening and supporting said rear wall in spaced relation to said opening.

CECIL C. ROWLEY.
LESLIE C. WALGREN.